US012633011B2

(12) United States Patent
Zhou et al.

(10) Patent No.: US 12,633,011 B2
(45) Date of Patent: May 19, 2026

(54) METHOD, APPARATUS, DEVICE, AND MEDIUM FOR IMAGE PROCESSING

(71) Applicant: Beijing Zitiao Network Technology Co., Ltd., Beijing (CN)

(72) Inventors: Siyu Zhou, Beijing (CN); Qian He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 236 days.

(21) Appl. No.: 18/289,855

(22) PCT Filed: May 6, 2022

(86) PCT No.: PCT/CN2022/091122
    § 371 (c)(1),
    (2) Date: Nov. 7, 2023

(87) PCT Pub. No.: WO2022/237633
    PCT Pub. Date: Nov. 17, 2022

(65) Prior Publication Data
    US 2024/0242406 A1     Jul. 18, 2024

(30) Foreign Application Priority Data

May 8, 2021    (CN) .......................... 202110500411.7

(51) Int. Cl.
    *G06T 11/60*        (2026.01)
    *G06T 5/50*         (2006.01)
    *G06T 7/12*         (2017.01)
(52) U.S. Cl.
    CPC ................ *G06T 11/60* (2013.01); *G06T 5/50* (2013.01); *G06T 7/12* (2017.01); *G06T 2207/20221* (2013.01); *G06T 2207/30201* (2013.01)

(58) Field of Classification Search
    None
    See application file for complete search history.

(56) References Cited

U.S. PATENT DOCUMENTS

2018/0357800 A1*  12/2018  Oxholm ................ G06T 11/001
2020/0258206 A1*   8/2020  Shen .................... G06V 40/165

FOREIGN PATENT DOCUMENTS

CN        107610042 A      1/2018
CN        107995428 A      5/2018
              (Continued)

OTHER PUBLICATIONS

Office Action in CN202110500411.7, mailed Jan. 19, 2023, 8 pages.
              (Continued)

*Primary Examiner* — Yanna Wu
(74) *Attorney, Agent, or Firm* — Astute IP Law Group

(57) ABSTRACT

Embodiments of this disclosure relate to a method, apparatus, device and medium for image processing, where the method includes: obtaining a user image; performing a beautifier operation on the user image with an image beautifier model, to obtain a beautified user image; wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image. This disclosure can reduce users' creation cost and improve image beautifier effects.

18 Claims, 3 Drawing Sheets

OBTAIN A USER IMAGE ⌐S102

PERFORM A BEAUTIFIER OPERATION ON THE USER IMAGE WITH AN IMAGE BEAUTIFIER MODEL, TO OBTAIN A BEAUTIFIED USER IMAGE ⌐S104

(56)        References Cited

FOREIGN PATENT DOCUMENTS

| | | | |
|---|---|---|---|
| CN | 109410131 | A | 3/2019 |
| CN | 110070484 | A | 7/2019 |
| CN | 110516545 | A | 11/2019 |
| CN | 111127378 | A | 5/2020 |
| CN | 111275650 | A | 6/2020 |
| CN | 111292262 | A | 6/2020 |
| CN | 111368685 | A | 7/2020 |
| CN | 112686820 | A | 4/2021 |
| CN | 113222841 | A | 8/2021 |

OTHER PUBLICATIONS

International Search Report in PCT/CN2022/091122, mailed Jul. 15, 2022, 3 pages.

* cited by examiner

OBTAIN A USER IMAGE     S102

PERFORM A BEAUTIFIER OPERATION ON THE USER IMAGE WITH AN IMAGE BEAUTIFIER MODEL, TO OBTAIN A BEAUTIFIED USER IMAGE     S104

FIRST SAMPLE IMAGE

FIRST SUB-MODEL G1

TO-BE-EDITED IMAGE

FIRST SEGMENTED IMAGE

SECOND SEGMENTED IMAGE

SECOND SUB-MODEL G2

TARGET IMAGE

IMAGE PROCESSING MODEL

SECOND SAMPLE IMAGE

IMAGE OBTAINING MODULE 402

IMAGE GENERATION MODULE404

1

METHOD, APPARATUS, DEVICE, AND MEDIUM FOR IMAGE PROCESSING

CROSS REFERENCE TO RELATED APPLICATIONS

This application is a national phase of International Application No. PCT/CN2022/091122, filed on May 6, 2022, which claims the priority of the Chinese Patent Application No. 202110500411.7, entitled "a method, apparatus, device, and medium for image processing", filed on May 8, 2021, the disclosures of which are incorporated herein by reference in their entireties.

FIELD

The present disclosure relates to the technical field of image processing, in particular, to a method, apparatus, device and medium for image processing.

BACKGROUND

With the development of science and technology, a beautifier function of a face in an image has become indispensable in an image application. At present, image beautifier mainly relies on policy driving. The policy driving means first using a large amount of data to train a face processing model, then using the trained model to recognize key points of a face in an image, and further beautifying the key points of the face to output a final beautified image. However, in the policy-driven image beautifier approach, using the key points of the face as a beautifier object will lead to a disproportion of five facial features and reduce the naturalness of the face, so the image integrity deteriorates, and the beautifier effect is unnatural; moreover, this approach does not support adjustment to the nose, mouth and other parts. In order to meet personalized needs of users for local adjustments, it is also necessary to provide additional one-to-one corresponding beautifier models for each part. The plurality of beautifier models provided additionally not only require a large amount of training data but also increase the creation cost of users in practical applications.

SUMMARY

In order to solve or at least in part solve the above technical problems, a method, apparatus, device and medium for image processing are provided.

An embodiment of the present disclosure provides a method for image processing, which comprises: obtaining a user image; performing a beautifier operation on the user image with an image beautifier model, to obtain a beautified user image; wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image.

Optionally, the performing an overall beautifier and adjustment of an image element to the first sample image based on a target image using an image processing model comprises: obtaining the first sample image and the target image; and generating the second sample image corresponding to the first sample image using the image processing model, wherein the image processing model comprises a first sub-model and a second sub-model, and the first sub-model is used for image overall beautifier, the second sub-model is used for adjustment of an image element based on the target image.

Optionally, a training process of the image beautifier model comprises: determining the first sample image and the second sample image as the training sample pair; training the image beautifier model based on the training sample pair to cause the trained image beautifier model to perform the beautifier operation on the user image, wherein the beautifier operation comprises adjustment of an image style feature and/or a target part of a target image.

Optionally, the generating the second sample image corresponding to the first sample image using the image processing model comprises: performing overall beautifier on the first sample image using the first sub-model, to obtain a to-be-edited image; and adjusting an image element of the to-be-edited image based on the target image using the second sub-model, to obtain the second sample image.

Optionally, the obtaining a second sample image by the obtaining a second sample image by adjusting an image element of the to-be-edited image based on the target image with the second sub-model comprises: inputting the target image and the to-be-edited image into the second sub-model; and obtaining a second sample image by transforming an image style of the to-be-edited image based on the target image using the second sub-model, wherein the second sample image comprises both a style feature of the to-be-edited image and an image style feature of the target image.

Optionally, the method further comprises: obtaining a first segmented image based on the target image; obtaining a second segmented image based on the to-be-edited image; obtaining the second sample image by inputting the first segmented image, the second segmented image, the target image, and the to-be-edited image into the second sub-model.

Optionally, the adjusting an image element of the to-be-edited image based on the target image using the second sub-model to obtain the second sample image comprises: performing face segmentation on the target image to obtain an initial segmented image; adding different identifications to the initial segmented image based on segmented parts on the initial segmented image, to obtain a plurality of first segmented images with different identifications, wherein an identification is used to represent a part on a first segmented image that is a beautifier target; performing face segmentation on the to-be-edited image, to obtain second segmented images; processing, using the second sub-model, a target part of a second segmented image and a first part represented by an identification in a first segmented image, to obtain a second sample image, wherein the target part and the first part are the same part of a face.

Optionally, the method further comprises: determining a first part on a first segmented image as a beautifier target based on an identification of the first segmented image; determining a second part on a second segmented image which is the same as the first part and determining the second part as a target part of the to-be-edited image.

Optionally, the obtaining the first sample image and the target image comprises: obtaining a first image set and a second image set, wherein the first image set comprises unbeautified images, the second image set comprises beautified images, and the number of images in the second image set is less than that in the first image set; obtaining any unbeautified image from the first image set as a first sample image; obtaining any beautified image from the second image set as a target image, wherein the target image is used as a beautifier target of the first sample image.

Optionally, the method further comprises: generating a generated image corresponding to an unbeautified image in the first image set using the first sub-model and determining a third image set from respective generated images; randomly combining images in the third image set and beautified images in the second image set, to obtain a plurality of different image combinations, wherein within an image combination, an image belonging to the third image set is a third sample image, and an image belonging to the second image set is a fourth sample image; repeating the following training operations with the different image combinations until a preset condition is satisfied: generating a fifth sample image by inputting an image combination into a to-be-trained second sub-model; determining a loss function between the fifth sample image and the fourth sample image; converging the to-be-trained second sub-model based on the loss function, and determining that the preset condition is satisfied and the training stops until the loss function converges to a preset value; using the second sub-model obtained after the training stops as the trained second sub-model.

Optionally, the image beautifier model is applied in a mobile terminal.

An embodiment of the present disclosure further provides an apparatus for image processing, which comprises: an image obtaining module for obtaining a user image; an image generation module for performing a beautifier operation on the user image with an image beautifier model, to obtain a beautified user image; wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image.

An embodiment of the present disclosure further provides an electronic device, which comprises: a processor; a memory for storing instructions executable by the processor; the processor reading the executable instructions from the memory and executing the instructions to perform a method for image processing as provided by the embodiments of the present disclosure.

An embodiment of the present disclosure further provides a computer readable storage medium stores a computer program, which is used for performing a method for image processing provided by the embodiments of the present disclosure.

Compared with the prior art, the technical solution provided by the embodiments of the present disclosure has the following advantages:

The embodiments of the present disclosure provide a method for image processing, apparatus, device and medium. The technical solution obtains a beautified user image by performing a beautifier operation on a user image with an image beautifier model; wherein the image beautifier model is trained with a training sample pair determined based on a first sample image and a second sample image; the second sample image is an image obtained by performing an overall beautifier and adjustment of an image element on the first sample image based on a target image using an image processing model and the image element is an image style feature and/or a target part of the target image. In this solution, the overall beautifier can better maintain the proportion of five facial features before and after image beautifier, thereby increasing the naturalness and integrity of the beautified user image. The adjustment of the image element can improve the diversity of image style and the beautifier effect of local parts of the beautified user image, enrich the image editing function and provide users with personalized beautifier schemes. Based thereon, by means of the image beautifier model, the present solution can meet a plurality of beautifier needs of users for the whole image, local image and image style, which significantly reduces users' creation cost and improves the image beautifier effect. At the same time, compared with a plurality of beautifier models required in the existing solutions, the present embodiment only needs to train one model, i.e., the image beautifier model. Obviously, the amount of data of pairs of training samples required by one image beautifier model is much less than that of training data required by the plurality of beautifier models.

BRIEF DESCRIPTION OF DRAWINGS

The accompanying drawings herein are incorporated into the specification and form part of this specification, show embodiments that are consistent with the present disclosure and are used together with the specification to explain the principles of the present disclosure.

In order to more clearly illustrate the technical solution in the embodiments of the present disclosure or the prior art, a brief description is presented below to the accompanying drawings used in the description of the embodiments or the prior art. It is obvious to those of ordinary skill in the art that other drawings can further be obtained from these drawings without creative effort.

DETAILED DESCRIPTION

In order to more clearly understand the above objects, features and advantages of the present disclosure, the solution of the present disclosure will be further described below. It should be noted that the embodiments of the disclosure and features in the embodiments may be combined with each other without conflict.

Many specific details are set forth in the description below to facilitate a full understanding of the present disclosure, whereas the present disclosure may also be implemented in ways other than those described herein; obviously, the embodiments in the specification are only a portion rather than all of the embodiments of the present disclosure.

At present, a policy-driven image beautifier approach uses key points of a face as a beautifier object, which leads to poor image integrity, and stiff and unnatural beautifier effect. Moreover, the approach does not support adjustment of local parts such as a nose and mouth. In order to meet the local adjustment needs of users, it is also necessary to additionally design other beautifier models specifically for each part, which will increase creation cost of users in practical applications. In addition, in the approach, the training sample data amount used in training a face processing model is quite large, so the iterative updating speed of the model is affected, and the quality of the training sample is difficult to guarantee, and the use effect of the trained model is affected. In order to improve at least one of the above problems, embodiments of the present disclosure provide a method, apparatus, device and medium for image processing. The technique can be used in generation of pairs of training samples in a model training stage and image beautifier in an application stage of the trained model. For the sake of understanding, the following embodiments of the present invention are described in detail below.

Figure 1:
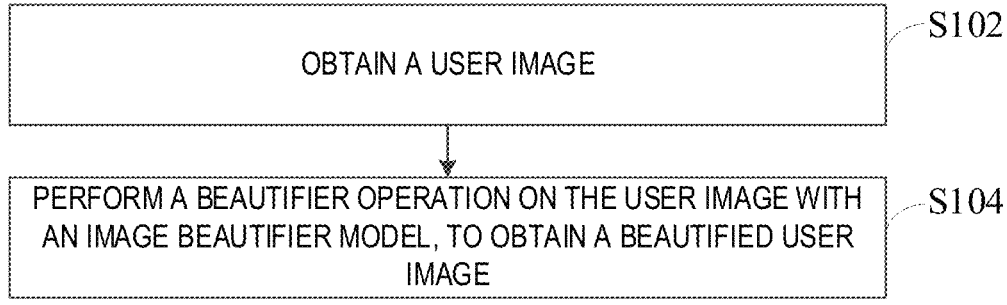
FIG. 1 is a schematic flowchart of a method for image processing provided by an embodiment of the present disclosure.

FIG. 1 is a schematic flowchart of a method for image processing provided by an embodiment of the present disclosure. The method may be performed by an apparatus for image processing, which may be implemented in software and/or hardware and generally integrated in an electronic device, for example, may be applied in various under-screen camera products, such as mobile phones, computers and cameras. As shown in FIG. 1, the method comprises:

At step S102, a user image is obtained. The user image may be an image to be beautified containing a face obtained by a user through an image selection operation, image shooting operation or image uploading operation in a terminal.

At Step S104, a beautifier operation is performed on the user image with an image beautifier model, to obtain a beautified user image.

Wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image.

The present embodiment can train a variety of image beautifier models with different beautifier effects by using a large amount of pairs of training samples with rich and diverse beautifier effects; regarding specific training approaches of image beautifier models, reference may be made to existing training approaches. The second sample image in the training sample pair can ensure high integrity and naturalness and at the same time adjust the beautifier effect of image elements (i.e. the image style features and/or the target parts). Based on this, the image beautifier model trained with the training sample pair can perform beautifier operations to the user image, the beautifier operations comprising the overall beautifier and the adjustment of image elements of the image. The resulting beautified user image can meet beautifier needs of users.

The method for image processing provided in the present embodiment uses an image beautifier model to perform beautifier operation on a user image to obtain a beautified user image; wherein the image beautifier model is trained with a training sample pair determined based on a first sample image and a second sample image; the second sample image is an image obtained by performing an overall beautifier and adjustment of an image element on the first sample image based on a target image using an image processing model and the image element is an image style feature and/or a target part of the target image. In this solution, the image beautifier model can perform overall beautifier and/or adjustment of image elements on the user image; wherein the overall beautifier can better maintain proportions of the five facial features before and after the image beautifier, thereby improving the naturalness and integrity of the beautified user image; the adjustment of image elements can improve the diversity of image style and the beautifier effect of local parts of the beautified user image, thereby enriching image editing functions and providing users with personalized beautifier schemes. Based on this, the present solution can meet the user's a plurality of beautifier needs for the whole image, local image and image style through the image beautifier model, which significantly reduces the user's creation cost and improves the image beautifier effect. At the same time, compared with a plurality of beautifier models required in the prior art, the present embodiment only needs to train one model, i.e., the image beautifier model. Obviously, the amount of data of pairs of training samples required by one image beautifier model is much less than that of training data required by a plurality of beautifier models.

With reference to the following two steps, the present embodiment offers a way of obtaining the second sample image:

At Step 1: the first sample image and the target image are obtained.

In one implementation, a first image set and a second image set are obtained first; wherein the first image set comprises unbeautified images, and the second image set comprises beautified images. And the number of images in the second image set is less than that in the first image set. Then, any unbeautified image is obtained from the first image set as the first sample image, and any beautified image is obtained from the second image set as the target image; wherein the target image is used as a beautifier target of the first sample image. It may be understood that the image pair of the first sample image and the target image obtained above is a result of any combination of images in the first image set and the second image set. The image pairs combined as such are numerous and rich and diverse. Any one image pair is used as the description object in the present embodiment.

The first sample image in the present embodiment is an image that has not undergone any beautifier processing, such as smoothing, style transformation or beautifier. As an example, the first sample image may be an image of a real person captured by an image capture device such as a camera, an image obtained by rendering a virtual person, or an image generated by an adversarial network. The target image is an image after beautifier processing with special effects such as filter, makeup and style. The target image is used as the beautifier target of the first sample image. As an example, the target image can be an image retrieved from the cloud or locally, or an image obtained by beautifying a portion of the first sample image.

At Step 2: the second sample image corresponding to the first sample image is generated using the image processing model; wherein the image processing model comprises a first sub-model and a second sub-model. The first sub-model is used for image overall beautifier, and the second sub-model is used for adjustment of an image element based on the target image. The first sub-model and the second sub-model, for example, can both be Generative Adversarial Networks (GANs).

The present embodiment realizes an overall beautifier effect of the image through the first sub-model and improves the integrity and naturalness of the beautified image. At the same time, in conjunction with the second sub-model, the image is adjusted in terms of image style special effects and/or local target parts of the face, and the resulting second sample image can have both personalized image style and local beautifier effects, thereby presenting better image beautifier effects.

Figure 2:
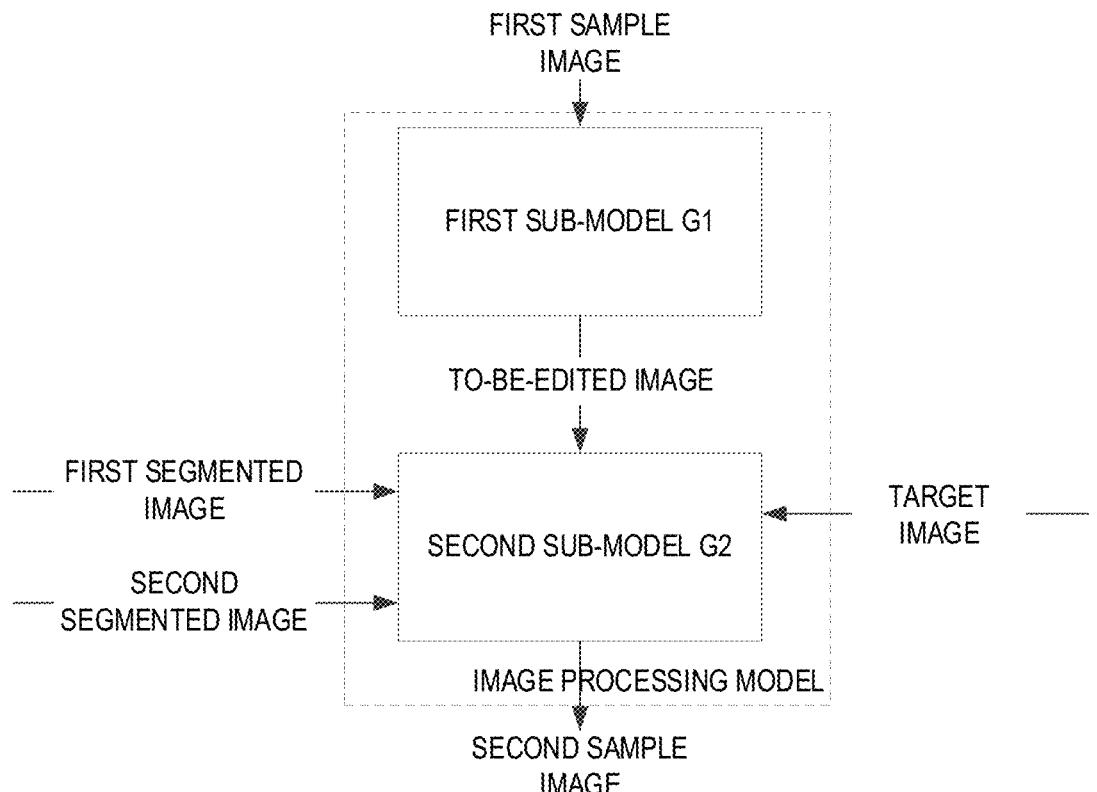
FIG. 2 is a schematic diagram of an image processing process provided by an embodiment of the present disclosure.

In order to facilitate the understanding of how to use the image processing model to generate the second sample image, the present embodiment provides an image processing process as shown in FIG. 2. In the present embodiment, the first sub-model is represented as G1 and the second sub-model is represented as G2. Any first sample image is input to the first sub-model G1 and is subjected to overall beautifier by the first sub-model G1 to obtain a to-be-edited image. In the present embodiment, the first sub-model is a pre-trained model, which can be directly applied to the overall beautifier of the image.

Afterwards, the second sub-model G2 is used to adjust an image element of the to-be-edited image based on the target image to obtain the second sample image.

When the image element is an image style feature, an embodiment of using the second sub-model to obtain the second sample image is provided herein, as to be shown below:

The target image and the to-be-edited image are input into the second sub-model G2; the image style of the to-be-edited image is transformed through the second sub-model G2 based on the target image to obtain the second sample image after style adjustment. The second sample image includes both an image style feature of the to-be-edited image and an image style feature of the target image.

Specifically, by means of the second sub-model G2, a feature is extracted from the target image to obtain a style semantic feature with a target image style; an image feature is extracted from the to-be-edited image to obtain an image semantic feature; and the second sample image after style adjustment is generated based on the style semantic feature and the image semantic feature.

The second sample image after style adjustment can be used as a training sample pair with the first sample image to train a predetermined image beautifier model, so that the trained image beautifier model can adjust the style of the user image.

Figure 3:
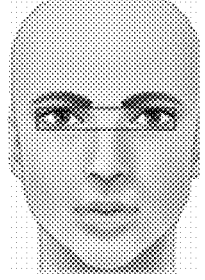
FIG. 3 is a schematic diagram of a first segmented image provided by an embodiment of the present disclosure.

When the image element is a target part of a face, in order to accurately match a face part of the target image as the beautifier target with a to-be-beautified target part of the to-be-edited image to adjust the target part, the present embodiment can perform a face segmentation process before obtaining the second sample image by using the second sub-model G2. The implementation refers to steps 1 to 3 below:

At step 1, a first segmented image is obtained based on a target image. Specifically, a key facial point on the target image may be extracted through a predetermined face segmentation model, and face segmentation is performed on the target image based on the key facial point to obtain an initial segmented image. Based on segmentation parts on the initial segmented image, different identifications are added to the initial segmented image to obtain a plurality of first segmented images with different identifications. Wherein the identification is used to represent a part on a first segmented image that is a beautifier target; the identification is a position parameter or a surrounding box of a corresponding part for example. Taking the surrounding box as an example, the first segmented image added with an eye part identification is as shown in FIG. 3.

It can be understood that one target image corresponds to a plurality of first segmented images with different identifications, including, for example: a first segment image identifying an eyebrow part, a first segment image identifying an eyebrow part, a first segment image identifying an eyebrow part, a first segment image identifying an eyebrow part.

fying an eye part, a first segment image identifying a nose part, and a first segment image identifying a cheekbone part, which will not be listed one by one. Each of the first segmented images corresponding to one target image can be arbitrarily combined with respective different to-be-edited images. Based on the first segmented images and the to-be-edited image, the diversity of the combination of images is further improved, and accordingly, a large number of rich second sample images and pairs of training samples can be further obtained in the future.

At step 2, a second segmented image is obtained based on the to-be-edited image. Specifically, a key facial point on the to-be-edited image can be extracted through a predetermined face segmentation model, and face segmentation is performed on the to-be-edited image based on the key facial point to obtain the second segmented image.

At step 3, the first segmented image, the second segmented image, the target image and the to-be-edited image are input into the second sub-model to obtain the second sample image.

After the first segmented image and the second segmented image are obtained, as shown in FIG. 2, the first segmented image, the second segmented image and the to-be-edited image are input to the second sub-model G2. By means of the second sub-model G2, a target part of the second segmented image and a first part represented by an identification in a first segmented image are processed to obtain a second sample image on which the target part has been adjusted; wherein the target part and the first part are the same part of a face, and the second sample image includes both a content feature of the target part and a content feature of the first part.

The specific determination approach for a target part that needs local beautifier on the to-be-edited image is: (1) based on an identification of a first segmented image, a first part on the first segmented image is determined as a beautifier target; the first part may take an eye part shown in FIG. 3 as an example; (2) a second part that is the same as the first part is determined on a second segmented image, and the second part is determined as a target part of the to-be-edited image, that is, the target part is the eye part on the to-be-edited image. Afterwards, the eye part on the to-be-edited image and the eye part on the first segmented image are fused to obtain the second sample image with the target part adjusted.

The second sample image with the target part adjusted may be used as a training sample pair with the first sample image to train a predetermined image beautifier model, so that the trained image beautifier model can perform local beautifier on a user image.

In one embodiment, when the image elements are an image style feature and a target part, the image style feature of the target part in the to-be-edited image may be adjusted using the second sub-model based on the target image, to obtain the second sample image with the style of the target part adjusted accordingly. In a specific implementation, the first segmented image corresponding to the target image and the second segmented image corresponding to the to-be-edited image may be input into the second sub-model; using the second sub-model, the image style of the target part in the second segmented image is transformed based on the first part in the first segmented image to obtain the second sample image with the style of the target part adjusted. The local part of the second sample image includes both an image style feature of the target part in the to-be-edited image and an image style feature of the first part in the target image. The above local part refers to the same part on the second sample image as the first part and the target part. In the present embodiment, the second sample image and the first image are used as a training sample pair to train a predetermined image beautifier model, so that the trained image beautifier model can perform overall beautifier and style transformation of a local part on a user image, enriching image editing functions of an image beautifier model in a terminal.

In order to enable the second sub-model in the above embodiment to be directly applied to the adjustment of image elements, it is necessary to train the second sub-model in advance. Parameters of the second sub-model need to be trained. The purpose of training the second sub-model is to finally determine the parameters that can meet requirements. By using the trained parameters, the second sub-model can get expected beautifier effects. The present embodiment offers a training method for the second sub-model, which comprises four steps as below:

At the first step, a generated image corresponding to an unbeautified image in the first image set is generated using the first sub-model and a third image set is determined from respective generated images.

At the second step, images in the third image set and beautified images in the second image set are randomly combined, to obtain a plurality of different image combinations, wherein within an image combination, an image belonging to the third image set is a third sample image, and an image belonging to the second image set is a fourth sample image.

In the present embodiment, considering that images in the first image set are easy to obtain and are large in quantity, target images in the second image set, though few, correspond to many first segmented images and the target images and the first segmented images can be combined with the images in the first image set in various ways, which can meet the adjustment needs of image style features and target parts. Based thereon, in order to reduce the cost of data acquisition, the present embodiment can directly use the first image set to generate the third image set and obtain the third sample image from the third image set, and also directly obtain the fourth sample image from the target images included in the second image set.

At the third step, the following training operations are repeated with the different image combinations until a preset condition is satisfied:

(i) generating a fifth sample image by inputting an image combination into a to-be-trained second sub-model. When specifically implementing, the third sample image and the fourth sample image are input to the to-be-trained second sub-model, and the fifth sample image with image elements corresponding to the third sample image adjusted is generated using the fourth sample image through the to-be-trained second sub-model.

(ii) determining a loss function between the fifth sample image and the fourth sample image.

(iii) converging the to-be-trained second sub-model based on the loss function, and determining that the preset condition is satisfied and the training stops until the loss function converges to a preset value.

At the fourth step, the second sub-model obtained after the training stops is used as the trained second sub-model.

The second sub-model that has been trained in the above way can better process the input user image in terms of the overall and local beautifier effect and the transformation effect of image style, so as to generate the image that meets the user's beautifier needs. Thus, the image beautifier effect and user experience are effectively improved.

After obtaining the first image based on the above embodiment and generating the second sample image using the image processing model that includes the first sub-model and the second sub-model, the image beautifier model may be trained with the training sample pair determined based on the first sample image and the second sample image. The present embodiment provides a training method for the image beautifier model as follow, the method comprising:

First, the first image and the second sample image are determined as the training sample pair. The second sample image in the present embodiment is obtained based on the first sample image and the target image. Thus, in practical application, a large number of different second sample images can be obtained by using different first sample images and different target images, and the second sample images have rich and diverse beautifier effects for the image style features and local facial parts. Accordingly, a large number of training sample pairs with rich and diverse beautifier effects can be constructed from different groups of the first sample images and the second sample images.

Then, the image beautifier model is trained based on the training sample pair, so that the trained image beautifier model can perform beautifier operation on the user image; wherein the beautifier operation comprises: the adjustment of image style features of the target image and/or the adjustment of the target part.

In the present embodiment, since the training sample pair used in training the image beautifier model can be generated based on only a small number of target images and any of the first sample images, the training sample pair is easy to update, and the corresponding trained image beautifier model has a fast iterative update speed, which can quickly respond to new image beautifier needs of users. In practical application, the image beautifier model may be trained in a server, and then the trained image beautifier model is applied to a mobile terminal. That is, the image beautifier model is distributed to a mobile phone, a computer and other terminals, to be recalled by the terminals and to perform beautifier operations on to-be-beautified user images.

Figure 4:
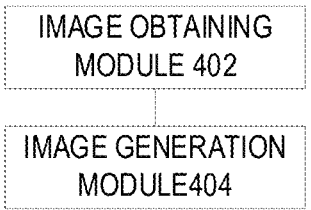
FIG. 4 is a structural diagram of an apparatus for image processing provided by an embodiment of the present disclosure.

FIG. 4 is a structural schematic diagram of an image processing apparatus provided by an embodiment of the present disclosure, which is used to implement the method for image processing. The apparatus may be implemented in software and/or hardware and generally be integrated in electronic devices, e.g., applied in various under-screen camera products such as mobile phones, computers, and cameras. As shown in FIG. 4, the apparatus comprises:

an image obtaining module 402 configured for obtaining a user image; and an image generation module 404 configured for performing a beautifier operation on the user image with an image beautifier model, to obtain a beautified user image;

wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image.

In some embodiments, the above-mentioned image processing apparatus further comprises an image processing module, which is configured for:

obtaining the first sample image and the target image; and generating the second sample image corresponding to the first sample image using the image processing model, wherein the image processing model comprises a first sub-model and a second sub-model, and the first sub-model is used for image overall beautifier, the second sub-model is used for adjustment of an image element based on the target image.

In some embodiments, the above-mentioned image processing apparatus further comprises a training model of the image beautifier model, which is configured for:

determining the first sample image and the second sample image as the training sample pair;

training the image beautifier model based on the training sample pair to cause the trained image beautifier model to perform the beautifier operation on the user image, wherein the beautifier operation comprises adjustment of an image style feature and/or a target part of a target image.

In some embodiments, the above-mentioned image processing module is specifically configured for:

performing overall beautifier on the first sample image using the first sub-model, to obtain a to-be-edited image; and adjusting an image element of the to-be-edited image based on the target image using the second sub-model, to obtain the second sample image.

In some embodiments, the above-mentioned image processing module is specifically configured for:

inputting the target image and the to-be-edited image into the second sub-model; and obtaining a second sample image by transforming an image style of the to-be-edited image based on the target image using the second sub-model, wherein the second sample image comprises both a style feature of the to-be-edited image and an image style feature of the target image.

In some embodiments, the above-mentioned image processing module is specifically configured for:

obtaining a first segmented image based on the target image; obtaining a second segmented image based on the to-be-edited image; obtaining the second sample image by inputting the first segmented image, the second segmented image, the target image, and the to-be-edited image into the second sub-model.

In some embodiments, the above-mentioned image processing module is specifically configured for:

performing face segmentation on the target image to obtain an initial segmented image;

adding different identifications to the initial segmented image based on segmented parts on the initial segmented image, to obtain a plurality of first segmented images with different identifications, wherein an identification is used to represent a part on a first segmented image that is a beautifier target;

performing face segmentation on the to-be-edited image, to obtain second segmented images;

processing, using the second sub-model, a target part of a second segmented image and a first part represented by an identification in a first segmented image, to obtain a second sample image, wherein the target part and the first part are the same part of a face.

In some embodiments, the above-mentioned image processing module is specifically configured for:

determining a first part on a first segmented image as a beautifier target based on an identification of the first segmented image;

determining a second part on a second segmented image which is the same as the first part and determining the second part as a target part of the to-be-edited image.

In some embodiments, the above-mentioned image processing module is specifically configured for:

obtaining a first image set and a second image set, wherein the first image set comprises unbeautified images, the second image set comprises beautified images, and the number of images in the second image set is less than that in the first image set;

obtaining any unbeautified image from the first image set as a first sample image;

obtaining any beautified image from the second image set as a target image, wherein the target image is used as a beautifier target of the first sample image.

In some embodiments, the above-mentioned image processing module is specifically configured for:

generating a generated image corresponding to an unbeautified image in the first image set using the first sub-model and determining a third image set from respective generated images;

randomly combining images in the third image set and beautified images in the second image set, to obtain a plurality of different image combinations, wherein within an image combination, an image belonging to the third image set is a third sample image, and an image belonging to the second image set is a fourth sample image;

repeating the following training operations with the different image combinations until a preset condition is satisfied:

generating a fifth sample image by inputting an image combination into a to-be-trained second sub-model;

determining a loss function between the fifth sample image and the fourth sample image;

converging the to-be-trained second sub-model based on the loss function, and determining that the preset condition is satisfied and the training stops until the loss function converges to a preset value;

using the second sub-model obtained after the training stops as the trained second sub-model.

The apparatus for image processing provided by the embodiments of the present disclosure can perform a method for image processing provided by any embodiment of the present disclosure and has the corresponding functional modules and beneficial effects of the performed method.

Figure 5:
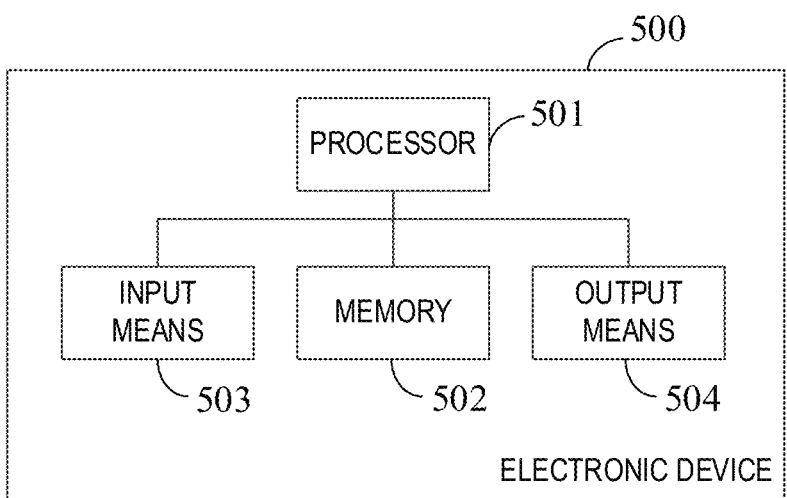
FIG. 5 is a structural diagram of an electronic device provided by an embodiment of the present disclosure.

FIG. 5 is a structural schematic diagram of an electronic device provided by an embodiment of the present disclosure. As depicted in FIG. 5, the electronic device 500 comprises one or more processors 501 and a memory 502 for storing executable instructions of the processor 501.

The processor 501 is used for reading the executable instructions from the memory 502 and executing the instructions to perform the method for image processing in the embodiment above. The processor 501 may be a central processing unit (CPU) or other form of processing unit with data processing power and/or instruction execution power, and may control other components in the electronic device 500 to perform desired functions.

The memory 502 may include one or more computer program products, which may include various forms of computer readable storage media, such as volatile memory and/or non-volatile memory. The volatile memory may, for example, include random access memory (RAM) and/or cache memory, etc. The non-volatile memory may, for example, include read-only memory (ROM), hard disk, flash memory, etc. One or more computer program instructions may be stored on the computer readable storage medium, and the processor 501 may run the program instructions to implement the method for image processing and/or other desired functions of the embodiments of the present disclosure described above. Various contents such as input signals, signal components, noise components, etc., may further be stored on the computer readable storage medium.

In one example, the electronic device 500 may further comprise: input means 503 and output means 504, which components are interconnected by a bus system and/or other form of connection mechanism (not shown).

In addition, the input means 503 may further comprise, for example, a keyboard, mouse, etc.

The output means 504 may output various information to the outside, including determined distance information, direction information, etc. The output means 504 may comprise, for example, a display, a loudspeaker, a printer, a communication network and a remote output device connected thereto.

Of course, for simplicity, FIG. 5 only shows some of the components of the electronic device 500 that are related to the present disclosure, while omitting components such as buses, input/output interfaces and the like. In addition, the electronic device 500 may further comprise any other appropriate components, depending on the specific application.

In addition to the methods and devices described above, an embodiment of the present disclosure may also be a computer program product, comprising computer program instructions which, when executed by a processor, cause the processor to perform the method for image processing described by the embodiments of the present disclosure.

The computer program product may be written in any combination of one or more program designing languages to execute program code for carrying out operations of the present disclosure. The program designing languages include an object oriented programming language such as Java, Smalltalk, C++ or the like, and conventional procedural programming languages, such as the "C" programming language or similar programming languages. The program code may execute entirely on the user's computing device, partly on the user's computing device, as a standalone software package, partly on the user's computing device and partly on a remote computing device or entirely on the remote computer or server.

In addition, an embodiment of the present disclosure may further be a computer readable storage medium on which computer program instructions are stored, the computer program instructions, when executed by a processor, cause the processor to perform the method for image processing provided by the embodiments of the present disclosure.

The computer readable storage medium may take any combination of one or more readable media. The readable medium can be a readable signal medium or a readable storage medium. The readable storage medium may include, but is not limited to, an electronic, magnetic, optical, electromagnetic, infrared or semiconductor system, apparatus or device, or any combination of the foregoing. More specific examples (non-exhaustive list) of the readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

An embodiment of the present disclosure further provides a computer program product, comprising computer programs/instructions which, when executed by a processor, perform a method in the embodiments of the present disclosure.

It should be noted that relational terms used herein such as "first," "second" and the like are merely used for differentiating one entity or operation from another, without necessarily requiring or suggesting any real relationship or sequence between these entities or operations. Moreover, terms "comprises," "includes" or any other variants are to be read as open terms, so that a process, method, article or device comprising a series of elements not only comprises those elements but also further comprises others that are not explicitly listed or further comprises elements that are inherent to the process, method, article or device. In the absence of further limitation, the element defined by a sentence "includes a . . . " does not exclude the existence of additional identical elements in the process, method, article, or device that includes the element.

Described above are only specific implementations of the present disclosure so as to enable those skilled in the art to understand or implement the present disclosure. Various modifications to these embodiments will be apparent to those skilled in the art, and the general principles defined herein may be implemented in other embodiments without departing from the spirit or scope of the present disclosure. Accordingly, the present disclosure will not be limited to these embodiments described herein, but will conform to the broadest scope consistent with the principles and novel features disclosed herein.

We claim:

1. A method for image processing, comprising:
obtaining, via an interface of an electronic device, a user image; and
performing, by the electronic device, a beautifier operation on the user image with an image beautifier model, to obtain a beautified user image;
wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image, wherein the image processing model comprises a first sub-model and a second sub-model;
wherein the performing an overall beautifier and adjustment of an image element to the first sample image based on a target image using an image processing model comprises:
performing overall beautifier on the first sample image using the first sub-model, to obtain a to-be-edited image;
obtaining a first segmented image based on the target image;
obtaining a second segmented image based on the to-be-edited image; and
obtaining the second sample image by inputting the first segmented image, the second segmented image, the target image, and the to-be-edited image into the second sub-model.

2. The method of claim 1, wherein the performing an overall beautifier and adjustment of an image element to the first sample image based on a target image using an image processing model comprises:
obtaining the first sample image and the target image; and generating the second sample image corresponding to the first sample image using the image processing model, wherein the first sub-model is used for image overall beautifier, the second sub-model is used for adjustment of an image element based on the target image.

3. The method of claim 2, wherein a training process of the image beautifier model comprises:

determining the first sample image and the second sample image as the training sample pair; and training the image beautifier model based on the training sample pair to cause the trained image beautifier model to perform the beautifier operation on the user image, wherein the beautifier operation comprises adjustment of an image style feature and/or a target part of a target image.

4. The method of claim 2, wherein the generating the second sample image corresponding to the first sample image using the image processing model comprises:

adjusting an image element of the to-be-edited image based on the target image using the second sub-model, to obtain the second sample image.

5. The method of claim 4, wherein the obtaining a second sample image by adjusting an image element of the to-be-edited image based on the target image with the second sub-model comprises:

inputting the target image and the to-be-edited image into the second sub-model; and obtaining a second sample image by transforming an image style of the to-be-edited image based on the target image using the second sub-model, wherein the second sample image comprises both a style feature of the to-be-edited image and an image style feature of the target image.

6. The method of claim 4, wherein the adjusting an image element of the to-be-edited image based on the target image using the second sub-model to obtain the second sample image comprises:

performing face segmentation on the target image to obtain an initial segmented image;

adding different identifications to the initial segmented image based on segmented parts on the initial segmented image, to obtain a plurality of first segmented images with different identifications, wherein an identification is used to represent a part on a first segmented image that is a beautifier target;

performing face segmentation on the to-be-edited image, to obtain second segmented images; and processing, using the second sub-model, a target part of a second segmented image and a first part represented by an identification in a first segmented image, to obtain a second sample image, wherein the target part and the first part are the same part of a face.

7. The method of claim 6, wherein the method further comprises:

determining a first part on a first segmented image as a beautifier target based on an identification of the first segmented image; and determining a second part on a second segmented image which is the same as the first part and determining the second part as a target part of the to-be-edited image.

8. The method of claim 2, wherein the obtaining the first sample image and the target image comprises:

obtaining a first image set and a second image set, wherein the first image set comprises unbeautified images, the second image set comprises beautified images, and the number of images in the second image set is less than that in the first image set;

obtaining any unbeautified image from the first image set as a first sample image; and obtaining any beautified image from the second image set as a target image, wherein the target image is used as a beautifier target of the first sample image.

9. The method of claim 8, wherein the method further comprises:

generating a generated image corresponding to an unbeautified image in the first image set using the first sub-model and determining a third image set from respective generated images;

randomly combining images in the third image set and beautified images in the second image set, to obtain a plurality of different image combinations, wherein within an image combination, an image belonging to the third image set is a third sample image, and an image belonging to the second image set is a fourth sample image; and repeating the following training operations with the different image combinations until a preset condition is satisfied:

generating a fifth sample image by inputting an image combination into a to-be-trained second sub-model;

determining a loss function between the fifth sample image and the fourth sample image;

converging the to-be-trained second sub-model based on the loss function, and determining that the preset condition is satisfied and the training stops until the loss function converges to a preset value; and using the second sub-model obtained after the training stops as the trained second sub-model.

10. The method of claim 1, wherein the image beautifier model is applied in a mobile terminal.

11. An electronic device, comprising:

a processor; and a memory for storing instructions executable by the processor which when executed by the processor, causing the processor to perform acts comprising:

obtaining, via an interface of the electronic device, a user image; and performing, by the electronic device, a beautifier operation on the user image with an image beautifier model, to obtain a beautified user image;

wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image, wherein the image processing model comprises a first sub-model and a second sub-model;

wherein the performing an overall beautifier and adjustment of an image element to the first sample image based on a target image using an image processing model comprises:

performing overall beautifier on the first sample image using the first sub-model, to obtain a to-be-edited image;

obtaining a first segmented image based on the target image;

obtaining a second segmented image based on the to-be-edited image; and obtaining the second sample image by inputting the first segmented image, the second segmented image, the target image, and the to-be-edited image into the second sub-model.

12. The electronic device of claim 11, wherein the performing an overall beautifier and adjustment of an image element to the first sample image based on a target image using an image processing model comprises:

obtaining the first sample image and the target image; and generating the second sample image corresponding to the first sample image using the image processing model, wherein the first sub-model is used for image overall beautifier, the second sub-model is used for adjustment of an image element based on the target image.

13. The electronic device of claim 12, wherein a training process of the image beautifier model comprises:

determining the first sample image and the second sample image as the training sample pair; and training the image beautifier model based on the training sample pair to cause the trained image beautifier model to perform the beautifier operation on the user image, wherein the beautifier operation comprises adjustment of an image style feature and/or a target part of a target image.

14. The electronic device of claim 12, wherein the generating the second sample image corresponding to the first sample image using the image processing model comprises:

adjusting an image element of the to-be-edited image based on the target image using the second sub-model, to obtain the second sample image.

15. The electronic device of claim 14, wherein the obtaining a second sample image by adjusting an image element of the to-be-edited image based on the target image with the second sub-model comprises:

inputting the target image and the to-be-edited image into the second sub-model; and obtaining a second sample image by transforming an image style of the to-be-edited image based on the target image using the second sub-model, wherein the second sample image comprises both a style feature of the to-be-edited image and an image style feature of the target image.

16. The electronic device of claim 14, wherein the adjusting an image element of the to-be-edited image based on the target image using the second sub-model to obtain the second sample image comprises:

performing face segmentation on the target image to obtain an initial segmented image;

adding different identifications to the initial segmented image based on segmented parts on the initial segmented image, to obtain a plurality of first segmented images with different identifications, wherein an identification is used to represent a part on a first segmented image that is a beautifier target;

performing face segmentation on the to-be-edited image, to obtain second segmented images; and processing, using the second sub-model, a target part of a second segmented image and a first part represented by an identification in a first segmented image, to obtain a second sample image, wherein the target part and the first part are the same part of a face.

17. The electronic device of claim 16, wherein the acts further comprises:

determining a first part on a first segmented image as a beautifier target based on an identification of the first segmented image; and determining a second part on a second segmented image which is the same as the first part and determining the second part as a target part of the to-be-edited image.

18. A non-transitory computer readable storage medium, characterized in that the storage medium stores a computer program which, when executed by a processor, performs acts comprising:

obtaining, via an interface of an electronic device, a user image; and performing, by the electronic device, a beautifier operation on the user image with an image beautifier model, to obtain a beautified user image;

wherein the image beautifier model is trained with a training sample pair determined based on a first sample image and a second sample image; the second sample image is an image obtained by performing an overall beautifier and adjustment of an image element on the first sample image based on a target image using an image processing model; the image element is an image style feature and/or a target part of the target image, wherein the image processing model comprises a first sub-model and a second sub-model;

wherein the performing an overall beautifier and adjustment of an image element to the first sample image based on a target image using an image processing model comprises:

performing overall beautifier on the first sample image using the first sub-model, to obtain a to-be-edited image;

obtaining a first segmented image based on the target image;

obtaining a second segmented image based on the to-be-edited image; and obtaining the second sample image by inputting the first segmented image, the second segmented image, the target image, and the to-be-edited image into the second sub-model.

\* \* \* \* \*